Dec. 3, 1940.     R. ROUDNICKÝ     2,223,705
PRESSURE GAUGE WITH BAROMETRIC CORRECTION
Filed April 20, 1938

INVENTOR.
Rudolf Roudnicky
ATTORNEYS.

Patented Dec. 3, 1940

2,223,705

UNITED STATES PATENT OFFICE 2,223,705

PRESSURE GAUGE WITH BAROMETRIC CORRECTION

Rudolf Roudnický, Prague, Czechoslovakia

Application April 20, 1938, Serial No. 203,182
In Czechoslovakia April 26, 1937

1 Claim. (Cl. 73—110)

Instruments, the responsive element of which is formed by a thin metal diaphragm, pressure meter drum or Bourdon tube, such as for example flight velocity meters, variometers, altimeters or other instruments based on a similar physical principle, vary in their response with the atmospheric air pressure, the temperature and are therefore inaccurate. Variations of temperature result in variation of the elasticity of the material of which the responsive elements are made, and furthermore the air movement in the capillary tube of the variometer is also influenced by the varying air density at various temperatures.

The present invention has for its object to provide a transmission mechanism for the aforesaid measuring instruments, which is so constructed that when variations occur in the barometric air pressure or in the temperature the transmission ratio of the indicating mechanism is so altered that variations from the correct indication of the measured values are compensated.

An embodiment of the invention is diagrammatically illustrated by way of example in the accompanying drawing wherein.

Figure 1:
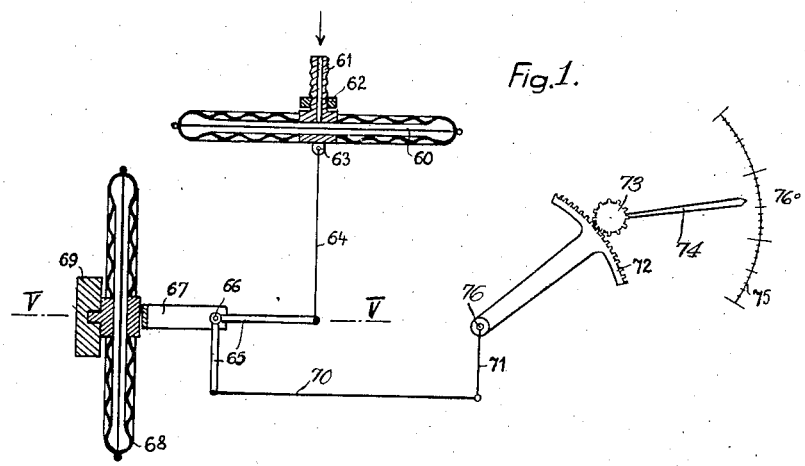
Figure 1 is a diagrammatic view partly in section of an apparatus for measuring and checking the loading pressure of an air compressor for an internal combustion engine for aircraft.

Figure 1 shows an embodiment of the invention in conjunction with a device for measuring and checking the loading pressure of an air compressor for internal combustion engines for aircraft. It is known that while the aeroplane is at low altitudes above the ground it is sufficient to force air into the cylinders of the engine at a lower pressure, than in those cases where the aeroplane is at high altitudes, where the air pressure is lower. Hitherto the air was introduced into a separate casing provided with the usual aneroid barometer, but these constructions were unsuccessful, since petrol and oil particles from the compressor also entered the casing.

Figure 2:
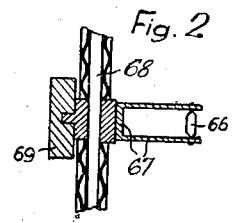
Figure 2 is a vertical section on the line V—V of Figure 1 of a detail shown in Figure 1.

According to the invention the compressed air from the compressor acts directly upon the walls of a pressure responsive drum 60, which is provided with a union 61, by means of which the interior of the drum 60 is connected with a delivery pipe of the compressor by means of a suitable tube not shown in the drawing. This pressure measuring drum is secured on one side to a fixed upright 62, and to the centre of its front diaphragm wall a link 64 is connected by means of a pivot 63, the link being pivotally connected to a two armed lever 65, which is pivotally mounted by means of a vertical pin 66 (Figure 2) in the bracket 67 mounted on the front wall of the completely closed pressure responsive drum 68 disposed on the stationary upright 69. The second free end of the bell crank lever 65 is connected by a pivotal link 70 to the lever arm 71, which turns a known segment 72 meshing with a pinion 73 of a needle 74 movable over the scale 75.

If the aeroplane rises to a high altitude it is sufficient for the pilot to observe the needle 74 and to increase gradually with increasing altitude the delivery pressure of the compressor in such a manner that the needle shall constantly point to a certain scale degree, for example to 76°. It will be seen in the drawing that the aneroid 68 itself turns the needle with increasing altitude of the aeroplane constantly towards lower pressure, provided that within the pressure measuring drum 60 the pressure of the inblown air remains the same. But when the aeroplane climbs this pressure drops gradually, provided that the action of the air compressor is not increased by the intervention of the pilot or of an automatic governor device. With stronger action of the compressor the effect of the diminishing pressure of the outer air upon the aneroid 68 is compensated, so that the needle 64 is maintained at a certain scale degree.

In apparatus of the kind described it is also required in most cases that the transmission ratio of the transmission gear between the diaphragm, the Bourdon tube, the barometer drum or similar measuring element and the needle shall be varied within a certain scale range.

What I claim and desire to secure by Letters Patent is:

A measuring instrument comprising a pressure responsive element consisting of an elastic drum, an indicator element, a compensating device including an elastic drum responsive to changes in barometric pressure, transmission mechanism connected between said pressure responsive element, said indicator element and said compensating device, said transmission mechanism consisting of a bell crank having one arm connected to said pressure responsive element and the other arm connected to said indicating element and means for supporting the pivot of said bell crank on said compensating device whereby said bell crank pivot is moved in accordance with barometric pressure to compensate for the effects of variations in atmospheric pressure upon the elastic drum of said pressure responsive element.

RUDOLF ROUDNICKÝ.